(12) United States Patent
Toyoizumi et al.

(10) Patent No.: US 10,291,792 B2
(45) Date of Patent: May 14, 2019

(54) READING APPARATUS DETERMINING WHETHER A READ IS VALID AND IMAGE FORMING APPARATUS INCLUDING THE READING APPARATUS

(71) Applicant: Konica Minolta, Inc., Tokyo (JP)

(72) Inventors: Teruhiko Toyoizumi, Tachikawa (JP); Tadashi Matsudaira, Hachioji (JP); Hirofumi Nakajima, Hino (JP); Tatsuo Ishizuka, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 35 days.

(21) Appl. No.: 15/718,883

(22) Filed: Sep. 28, 2017

(65) Prior Publication Data
US 2018/0109687 A1 Apr. 19, 2018

(30) Foreign Application Priority Data
Oct. 17, 2016 (JP) ................. 2016-203580

(51) Int. Cl.
*H04N 1/00* (2006.01)
*H04N 1/60* (2006.01)
*H04N 1/387* (2006.01)

(52) U.S. Cl.
CPC ..... *H04N 1/00082* (2013.01); *H04N 1/00013* (2013.01); *H04N 1/00015* (2013.01); *H04N 1/00023* (2013.01); *H04N 1/00037* (2013.01); *H04N 1/00045* (2013.01); *H04N 1/00074* (2013.01); *H04N 1/00087* (2013.01); *H04N 1/00588* (2013.01); *H04N 1/00602* (2013.01); *H04N 1/00644* (2013.01); *H04N 1/387* (2013.01); *H04N 1/6033* (2013.01)

(58) Field of Classification Search
CPC ............ H04N 1/00082; H04N 1/6033; H04N 1/00045; H04N 1/00087; H04N 1/00023; H04N 1/387; H04N 1/00015; H04N 1/00037; H04N 1/00074; H04N 1/00644; H04N 1/00588; H04N 1/00602; H04N 1/00013
See application file for complete search history.

(56) References Cited

U.S. PATENT DOCUMENTS

2016/0191737 A1* 6/2016 Hirao ................. H04N 1/00801
358/1.15

FOREIGN PATENT DOCUMENTS

JP          2007232986 A     9/2007

* cited by examiner

*Primary Examiner* — Christopher Wait
(74) *Attorney, Agent, or Firm* — Lucas & Mercanti, LLP

(57) ABSTRACT

A reading apparatus includes: a conveyor that conveys transfer paper on which an image has been formed by using rotation of a stepping motor; a driver that performs control in such a manner as to supply control pulses to the stepping motor and rotate the stepping motor in predetermined target rotation steps; an encoder that detects the rotation of the stepping motor and obtains detected rotation steps; a reader that reads the image formed on the transfer paper in a state where the transfer paper is being conveyed by the conveyor; and a controller that detects a difference between an ideal value and an actual value of the detected rotation steps in the target rotation steps, and determines, on the basis of the difference, whether a read in the reader is valid or invalid.

13 Claims, 13 Drawing Sheets

FIG. 11A

| STEP NUMBER | FREQUENCY PPS | ENCODER | | CUMULATIVE DIFFERENCE NUMBER |
| --- | --- | --- | --- | --- |
| | | IDEAL VALUE | ACTUAL VALUE | |
| | | NUMBER OF CLOCKS | | |
| 0 | 3000 | 800 | 800 | −5 |
| 10 | 3000 | 800 | 801 | −4 |
| 20 | 3000 | 800 | 800 | −4 |
| 30 | 3000 | 800 | 801 | −3 |
| 40 | 3000 | 800 | 800 | −3 |
| 50 | 3000 | 800 | 801 | −2 |
| 60 | 3000 | 800 | 800 | −2 |
| 70 | 3000 | 800 | 801 | −1 |
| 80 | 3000 | 800 | 800 | −1 |
| 90 | 3000 | 800 | 800 | −1 |
| 100 | 3000 | 800 | 801 | 0 |
| 110 | 3000 | 800 | 800 | 0 |
| 120 | 3000 | 800 | 801 | 1 |
| 130 | 3000 | 800 | 800 | 1 |
| 140 | 3000 | 800 | 801 | 2 |
| 150 | 3000 | 800 | 800 | 2 |
| 160 | 3000 | 800 | 801 | 3 |
| 170 | 3000 | 800 | 801 | 4 |
| 180 | 3000 | 800 | 800 | 4 |
| 190 | 3000 | 800 | 800 | 4 |
| 200 | 3000 | 800 | 801 | 5 |
| 210 | 3000 | 800 | 800 | 5 |
| 220 | 3000 | 800 | 799 | 4 |
| 230 | 3000 | 800 | 800 | 4 |
| 240 | 3000 | 800 | 799 | 3 |
| 250 | 3000 | 800 | 800 | 3 |
| 260 | 3000 | 800 | 799 | 2 |
| 270 | 3000 | 800 | 800 | 2 |
| 280 | 3000 | 800 | 799 | 1 |
| 290 | 3000 | 800 | 800 | 1 |
| 300 | 3000 | 800 | 799 | 0 |
| 310 | 3000 | 800 | 800 | 0 |
| 320 | 3000 | 800 | 799 | −1 |
| 330 | 3000 | 800 | 800 | −1 |
| 340 | 3000 | 800 | 799 | −2 |
| 350 | 3000 | 800 | 800 | −2 |
| 360 | 3000 | 800 | 799 | −3 |
| 370 | 3000 | 800 | 800 | −3 |
| 380 | 3000 | 800 | 799 | −4 |

FIG. 11B

| STEP NUMBER | FREQUENCY PPS | ENCODER IDEAL VALUE NUMBER OF CLOCKS | ENCODER ACTUAL VALUE NUMBER OF CLOCKS | CUMULATIVE DIFFERENCE NUMBER |
|---|---|---|---|---|
| 0 | 2999 | 800 | 800 | 0 |
| 10 | 2999 | 799 | 800 | 0 |
| 20 | 2999 | 800 | 800 | 0 |
| 30 | 2999 | 799 | 800 | 0 |
| 40 | 2999 | 800 | 800 | 0 |
| 50 | 2999 | 799 | 800 | 0 |
| 60 | 3000 | 800 | 800 | 0 |
| 70 | 3000 | 800 | 800 | 0 |
| 80 | 3000 | 800 | 800 | 0 |
| 90 | 3000 | 800 | 800 | 0 |
| 100 | 3000 | 800 | 800 | 0 |
| 110 | 3000 | 800 | 800 | 0 |
| 120 | 3000 | 800 | 800 | 0 |
| 130 | 3000 | 800 | 800 | 0 |
| 140 | 3000 | 800 | 800 | 0 |
| 150 | 3000 | 800 | 800 | 0 |
| 160 | 3001 | 800 | 800 | 0 |
| 170 | 3001 | 801 | 800 | 0 |
| 180 | 3001 | 800 | 800 | 0 |
| 190 | 3001 | 801 | 800 | 0 |
| 200 | 3001 | 800 | 800 | 0 |
| 210 | 3001 | 801 | 800 | 0 |
| 220 | 3001 | 800 | 800 | 0 |
| 230 | 3001 | 800 | 800 | 0 |
| 240 | 3001 | 801 | 800 | 0 |
| 250 | 3001 | 800 | 800 | 0 |
| 260 | 3000 | 800 | 800 | 0 |
| 270 | 3000 | 800 | 800 | 0 |
| 280 | 3000 | 800 | 800 | 0 |
| 290 | 3000 | 800 | 800 | 0 |
| 300 | 3000 | 800 | 800 | 0 |
| 310 | 3000 | 800 | 800 | 0 |
| 320 | 3000 | 800 | 800 | 0 |
| 330 | 3000 | 800 | 800 | 0 |
| 340 | 3000 | 800 | 800 | 0 |
| 350 | 3000 | 800 | 800 | 0 |
| 360 | 2999 | 800 | 800 | 0 |
| 370 | 2999 | 799 | 800 | 0 |
| 380 | 2999 | 800 | 800 | 0 |

READING APPARATUS DETERMINING WHETHER A READ IS VALID AND IMAGE FORMING APPARATUS INCLUDING THE READING APPARATUS

Japanese Patent Application No. 2016-203580 filed on Oct. 17, 2016, including description, claims, drawings, and abstract the entire disclosure is incorporated herein by reference in its entirety.

BACKGROUND

Technological Field

The present invention relates to a technology for appropriately reading a formed image of a chart and adjusting an image forming apparatus.

Description of the Related Art

There is an image forming system where a reading apparatus (an output matter reading apparatus) is connected to downstream of an image forming apparatus that forms an image on transfer paper to read the image formed on the transfer paper with the reading apparatus. There is similarly an image forming apparatus in which a reading unit (a scanner=an output matter reading unit) is placed downstream of an image forming unit that forms an image on transfer paper to read the image formed on the transfer paper with the reading unit.

An image forming apparatus such as a printer or multi-function printer has an image adjustment mode, and conventionally has the function of, in image adjustment mode, printing a colorimetric patch of a color, detecting the colorimetric patch with an RGB color density sensor or the like, comparing the colorimetric patch with print base data, and if there is a difference between them, correcting print density and the like, and forming an image, to increase the quality of an output image.

In recent years, as such an image adjustment mode, there has been an image forming system that reads an image with a scanner while conveying transfer paper conveyed after the image was formed to a post processor, analyzes the image data, applies corrections with an image processing apparatus, and provides a stable image. In recent years, an image reading apparatus where an image scanner is mounted in line in or downstream of an image forming apparatus to reduce image adjustment time required to increase quality has also emerged. The image scanner can be used to correct misalignment on the front and back sides of paper, image density, color, and the like of an output image in real time.

Conveyance upon reading an image on transfer paper requires high accuracy by using a stepping motor and the like. For example, if the conveying speed is reduced, an incorrect read result that the density is higher than intended is obtained. On the other hand, if the conveying speed is increased, an incorrect read result that the density is lower than intended is obtained.

As this type of technology, various related proposals have been made in JP 2007-232986 A.

In JP 2007-232986 A, a stepping motor is used as a drive source, rotational unevenness per revolution is calculated from the number of output pulses of an encoder that detects the angular velocity of a rotating body that rotates via a drive gear to create a profile, and change the stepping motor drive frequency, and accordingly the speed of the rotating body is made highly accurate and stable.

Moreover, for example, the detection of stepping motor pull-out is also employed as a known technology. However, it is not possible to handle subtle speed fluctuations.

However, upon the above conveyance of transfer paper to read an image, the speed may fluctuate suddenly at impact resulting from, for example, a collision of the transfer paper with a conveying roller. Moreover, in an image forming system where a post processing apparatus is connected downstream of a reading unit, there are various types of post processing. However, load fluctuates during post processing operation. Accordingly, the speed may fluctuate suddenly. Conditions on the size and type of transfer paper at post processing, the number of sheets of paper to be post processed, and the like vary. It is difficult to apply corrections assuming speed fluctuations. Hence, even if transfer paper is conveyed with high accuracy, when the above speed fluctuations occur, a trouble may occur in image read data. As a result, an image may not be appropriately corrected.

SUMMARY

An object of the present invention is to realize a reading apparatus and an image forming system, and an image forming apparatus that can appropriately correct an image when the speed fluctuates during highly accurate conveyance for reading transfer paper.

To achieve the abovementioned object, according to an aspect of the present invention, a reading apparatus reflecting one aspect of the present invention comprises: a conveyor that conveys transfer paper on which an image has been formed by using rotation of a stepping motor; a driver that performs control in such a manner as to supply control pulses to the stepping motor and rotate the stepping motor in predetermined target rotation steps; an encoder that detects the rotation of the stepping motor and obtains detected rotation steps; a reader that reads the image formed on the transfer paper in a state where the transfer paper is being conveyed by the conveyor; and a controller that detects a difference between an ideal value and an actual value of the detected rotation steps in the target rotation steps, and determines, on the basis of the difference, whether a read in the reader is valid or invalid.

BRIEF DESCRIPTION OF THE DRAWING

The advantages and features provided by one or more embodiments of the invention will become more fully understood from the detailed description given hereinbelow and the appended drawings which are given by way of illustration only, and thus are not intended as a definition of the limits of the present invention:

FIGS. 11A and 11B are explanatory diagrams illustrating a state of motor control in the embodiment of the present invention.

DETAILED DESCRIPTION OF EMBODIMENTS

Hereinafter, a reading apparatus, an image forming system including the reading apparatus, and an image forming apparatus including the reading apparatus according to one or more embodiments of the present invention will be described in detail with reference to the drawings. However, the scope of the invention is not limited to the disclosed embodiments.

[Configuration]

Figure 1:
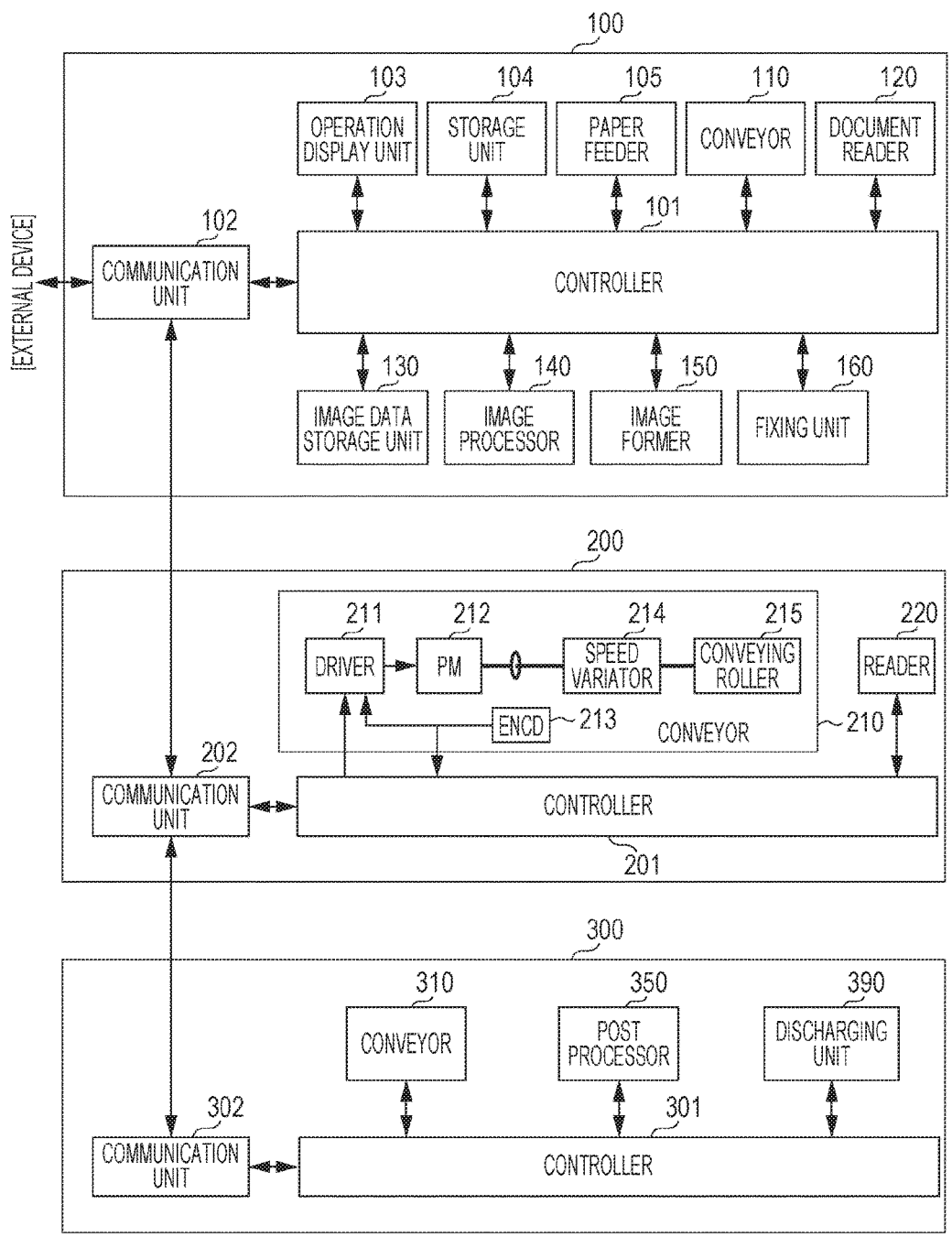
FIG. 1 is a configuration diagram illustrating a configuration of an embodiment of the present invention.
Figure 2:
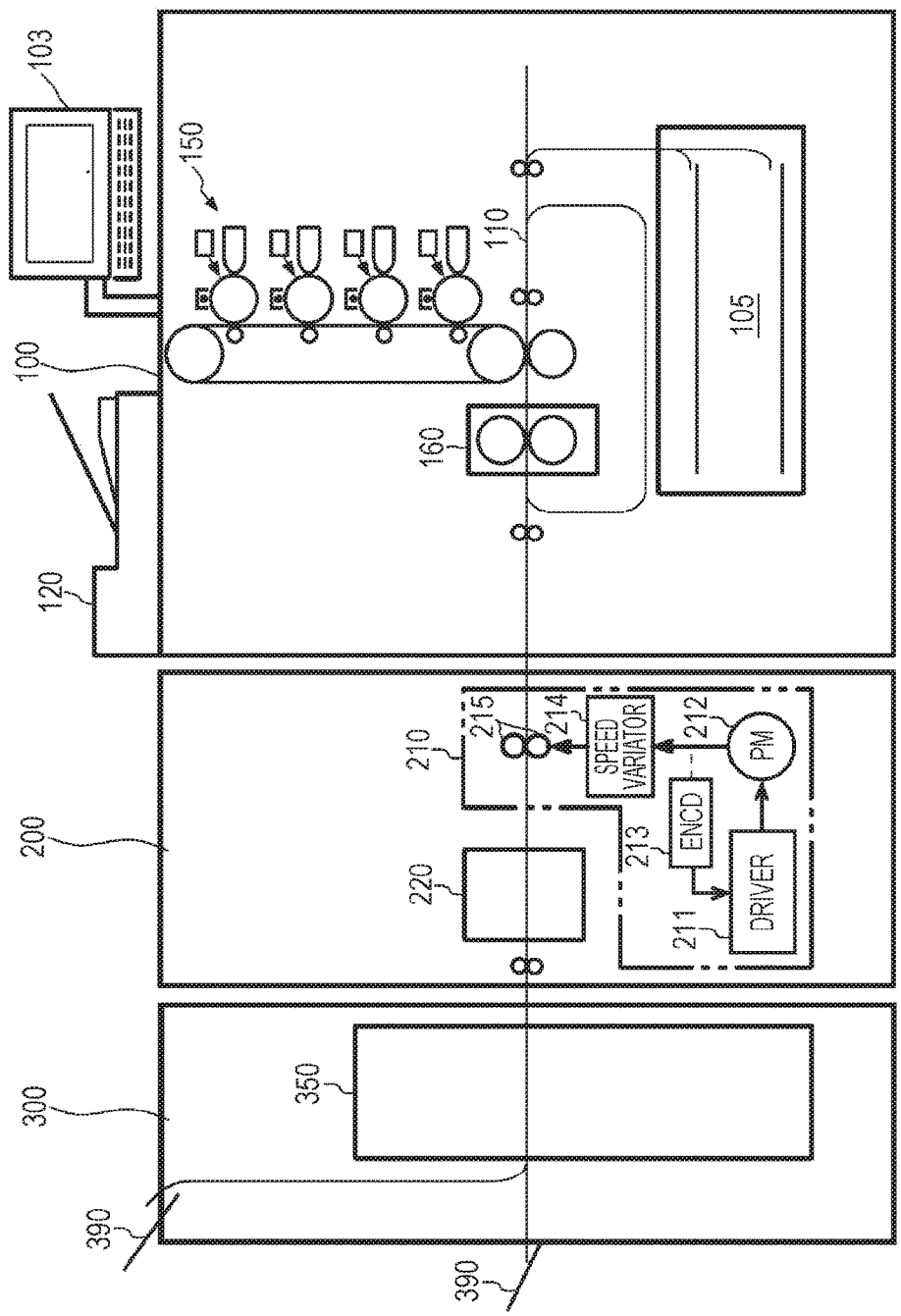
FIG. 2 is a configuration diagram illustrating a configuration of the embodiment of the present invention.

The configuration of the image forming system including the reading apparatus, the image forming apparatus, and a post processing apparatus is described in detail as an example on the basis of FIGS. 1 and 2.

An image forming apparatus 100 is configured including a controller 101 that controls units in the image forming apparatus 100, a communication unit 102 for communicating with another device connected, an operation display unit 103 that accepts a user's operation input and displays a status of the image forming apparatus 100, a storage unit 104 where various settings are stored, a paper feeder 105 that can feed transfer paper stored on a paper feed tray, a conveyor 110 that conveys transfer paper in the apparatus, a document reader 120 that reads an image of a document with an imaging device, an image data storage unit 130 where image data upon forming an image and various types of data are stored, an image processor 140 that executes various types of image processing required to form an image, an image former 150 that forms an image on transfer paper on the basis of an image formation command and image data, and a fixing unit 160 that stabilizes a tonner image formed on transfer paper, with heat and pressure.

As illustrated in FIG. 2, the image former 150 is configured including image carriers on each of which a tonner image is formed, charging units that each charge the image carrier with a predetermined potential, exposing units that each expose the charged image carrier to light according to image data to form a latent image, developing units that each develop the latent image to change it into a toner image, an intermediate transfer unit on which the toner image of the image carrier of each color is merged, a transfer unit that transfers the toner image on the intermediate transfer unit onto transfer paper. The image former 150 that forms a color image is illustrated here. However, the image former may form a single color image.

The controller 101 in the image forming apparatus 100 controls the image former 150 in such a manner as to, when having received a notice that a read of an image in a reading apparatus 200 described below is invalid, form the image, the read of which has been determined to be invalid, again on transfer paper. Moreover, the controller 101 in the image forming apparatus 100 controls the image former 150 in such a manner as to, when having received a notice that a read of an image in the reading apparatus 200 is invalid, if an image is present in an area corresponding to the notice, form the image being present again in a different area on transfer paper. Moreover, the controller 101 in the image forming apparatus 100 controls the image former 150 in such a manner as to, when having received a notice that a read of an image in the reading apparatus 200 is invalid, not form an image of an area, the read of which has been determined to be valid, and form an image of an area, the read of which has been determined to be invalid, again on transfer paper.

The reading apparatus 200 is placed downstream of the image forming apparatus 100 in a transfer paper travel direction. The reading apparatus 200 is configured including a controller 201, a communication unit 202, a conveyor 210 that conveys transfer paper, and a reader 220 that reads an image formed on transfer paper. It is configured in such a manner that an image on transfer paper formed and output by the image forming apparatus 100 is read while being conveyed in the reading apparatus 200.

The conveyor 210 is configured including a driver 211, a stepping motor 212, an encoder 213, a speed variator 214, and a conveying roller 215. The driver 211 generates control pulses for rotating the stepping motor 212 in target rotation steps to convey transfer paper at a predetermined conveying speed when the transfer paper is read by the reader 220. The encoder 213 performs detection on a rotary shaft of the stepping motor 212, and obtains detected rotation steps. The speed variator 214 changes the rotational speed of the stepping motor 212 in such a manner that the conveying roller 215 conveys transfer paper at the predetermined conveying speed.

The controller 201 detects a difference between an ideal value and an actual value of the detected rotation steps of the encoder 213 in the target rotation steps of the driver 211, and determines, on the basis of the difference, whether a read in the reader 220 is valid or invalid. The controller 201 then notifies the controller 101 of the image forming apparatus 100 of the determination result.

Moreover, the controller 201 controls the target rotation steps of the driver 211 in such a manner as to offset the above difference.

A post processing apparatus 300 is placed downstream of the reading apparatus 200 in the transfer paper travel direction. The post processing apparatus 300 is configured including a controller 301, a communication unit 302, a conveyor 310 that conveys transfer paper, a post processor 350 that performs post processing such as cutting and folding on transfer paper, and a discharging unit 390 that discharges transfer paper. The contents of post processing of the post processor 350 are not particularly limited.

The state where the reader 220 is placed in the reading apparatus 200 is illustrated. However, the reader 220 is not limited to this placement, and may be placed, for example, downstream of the fixing unit 160 in the image forming apparatus 100. In this case, the conveyor 110 controls conveyance with high accuracy as in the conveyor 210. Moreover, the state where the reader 220 is placed in the reading apparatus 200 is illustrated. However, the reader 220 is not limited to this placement, and may be placed, for example, upstream of the post processor 350 in the post processing apparatus 300. In this case, the conveyor 310 controls conveyance with high accuracy as in the conveyor 210.

[Operation (1)]

An embodiment of the reading apparatus, a reading control method, and a reading control program as operation (1) of the embodiment is described below with reference to a flowchart of FIG. 3. A description is given here on the precondition that the image forming apparatus 100 and the reading apparatus 200 work in an interlocked fashion. Moreover, the description of the operation is also the processing procedure of the reading control method. Moreover, the description of the operation is also a description of process steps of the reading control program.

Figure 3:
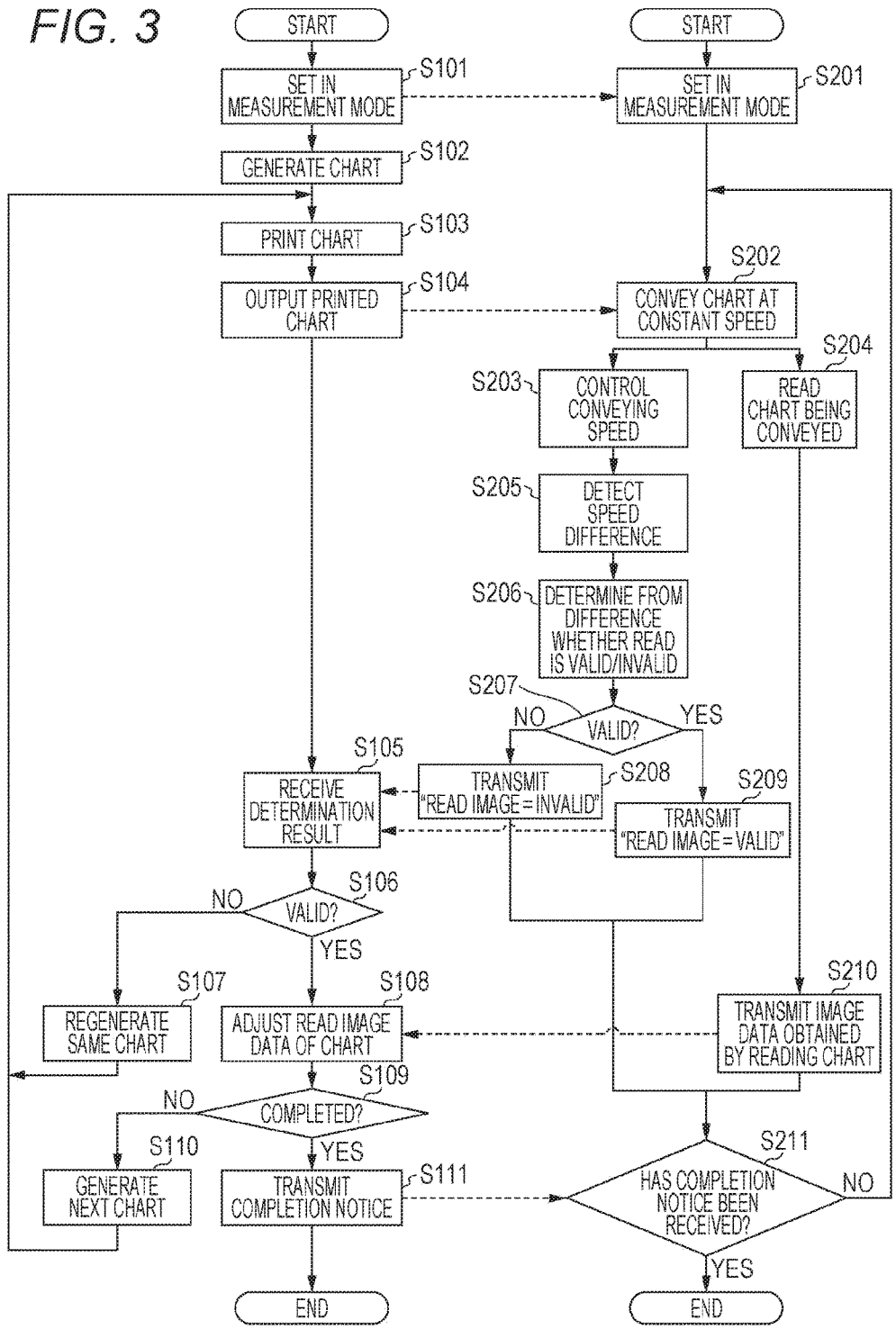
FIG. 3 is a flowchart illustrating operation of the embodiment of the present invention.

The controller 101 refers to the operating status and past operation records of the image forming apparatus 100, and causes the image forming apparatus 100 to operate in measurement mode if needed (step S101 in FIG. 3). Moreover, the controller 201 receives a notice of the measurement mode from the controller 101, and causes the reading apparatus 200 to operate in measurement mode (step S201 in FIG. 3).

The controller 101 controls the image data storage unit 130 and the image processor 140 in such a manner as to read a pattern from the storage unit 104, and generate a chart used in measurement mode, and generates chart image data (step S102 in FIG. 3). The controller 101 then controls the image former 150 in such a manner as to form an image of the chart on transfer paper by using the generated chart image data (step S103 in FIG. 3). Moreover, the controller 101 controls the conveyor 110 in such a manner as to convey the chart formed on the transfer paper to the reading apparatus 200 (step S104 in FIG. 3).

The chart includes crossmarks for registration, and various density patches predetermined for each color used in image formation. The chart is, for example, one described in FIG. 4. A state is illustrated in which different density patches 1 to 9 have been formed for each color of CMYK used for image formation. In reality it is also possible to form patches in more detailed levels or repeatedly form a patch with the same density.

In the reading apparatus 200, which has received the transfer paper with the chart thereon from the image forming apparatus 100, the conveyor 210 conveys the transfer paper at a constant speed in accordance with the control by the controller 201 (step S202 in FIG. 3).

The conveyor 210 uses the rotation of the stepping motor 212 controlled by the driver 211 in such a manner as to rotate in predetermined target rotation steps to change the speed with the speed variator 214, then drive the conveying roller 215, and convey the transfer paper with the chart thereon (step S203 in FIG. 3).

Moreover, the controller 201 controls the reader 220 in such a manner as to read an image of the chart formed on the transfer paper in a state where the transfer paper is being conveyed by the conveyor 210 in this manner (step S204 in FIG. 3).

The encoder 213 performs detection on the rotary shaft of the stepping motor 212, performs detection for one step of a rotation of the stepping motor 212 in a plurality of resolution levels, and outputs a detected value as the detected rotation steps. The plurality of levels indicates state levels where at least a pull-out state of the stepping motor 212, and a plurality of states less than pull-out can be distinguished.

The controller 201 then detects a difference between the ideal value and the actual value of the detected rotation steps in the encoder 213 in the target rotation steps of the driver 211 (step S205 in FIG. 3). The controller 201 then determines, on the basis of the difference, whether a read in the reader 220 is valid or invalid (step S206 in FIG. 3).

For example, a case is assumed in which when the driver 211 rotates the stepping motor 212 by one step, if the stepping motor 212 rotates ideally without a lead or lag, the encoder 213 outputs 100 pulses as the ideal value of the detected rotation steps.

In this case, if the actual value of the detected rotation steps of the stepping motor 212 has a difference equal to or greater than 50 pulses corresponding to ½ of one step from the ideal value, that is, if the actual value of the detected rotation steps of the encoder 213 is less than 49 pulses, or equal to or greater than 151 pulses, the controller 201 determines that the stepping motor 212 is under pull-out conditions. In this case, the controller 201 determines that the image of the chart read from the transfer paper conveyed under pull-out conditions is invalid (step S206 in FIG. 3).

Moreover, if a difference equal to or greater than 10 pulses corresponding to 1/10 of one step of the stepping motor 212 arises between the ideal value and the actual value, that is, if the actual value of the detected rotation steps of the encoder 213 is equal to or less than 90 pulses, or equal to or greater than 110 pulses, the controller 201 determines that the stepping motor 212 is not under pull-out conditions but the speed is fluctuating. In this case, the controller 201 determines that the image of the chart read from the transfer paper conveyed in the state where the speed is fluctuating is invalid (step S206 in FIG. 3).

If a difference less than 10 pulses corresponding to 1/10 of one step of the stepping motor 212 arises between the ideal value and the actual value, that is, if the actual value of the detected rotation steps of the encoder 213 is equal to or greater than 91 pulses and equal to or less than 109 pulses, the controller 201 determines that the conveying speed by the stepping motor 212 is within a normal range. In this case, the controller 201 determines that the image of the chart read from the transfer paper conveyed in the state where the speed is within the normal range is valid (step S206 in FIG. 3).

The detected rotation steps of the encoder 213 takes any value according to the specifications of the encoder 213. Moreover, ½ and 1/10 being the thresholds of a difference between the ideal value and the actual value of the detected rotation steps may be predetermined as the thresholds and stored in the storage unit 104. Moreover, the user may change the thresholds if needed.

The controller 201 then notifies the controller 101 of the image forming apparatus 100 via the communication units 202 and 102 of a determination result (read image=invalid or read image=valid) based on a difference between the ideal value and the actual value of the detected rotation steps as described above (steps S207, S208, and S209 in FIG. 3).

Moreover, the controller 201 transmits the read image data obtained by reading the chart with the reading apparatus 200 to the controller 101 of the image forming apparatus 100 via the communication units 202 and 102 (step S210 in FIG. 3).

The controller 101, which has received a determination result of validity/invalidity of a read image as described above (step S105 in FIG. 3), controls the image data storage unit 130 and the image processor 140 in such a manner as to, if the read image had been determined to be invalid (NO in step S106 in FIG. 3), read a pattern from the storage unit 104 for an image of the same chart as the one whose read image data had been determined to be invalid, and generate a chart used in measurement mode, and generates chart image data (step S107 in FIG. 3). The controller 101 then performs control in such a manner as to again repeat the formation of an image of the generated chart image data on transfer paper (step S103 in FIG. 3) and the conveyance of the chart formed on the transfer paper to the reading apparatus 200 (step S104 in FIG. 3).

On the other hand, the controller 101, which has received a determination result of validity/invalidity of a read image as described above (step S105 in FIG. 3), if the read image was determined to be valid (YES in step S106 in FIG. 3), makes various image adjustments to, for example, density and the image forming position, in the image former 150, by using the read image data of the chart (step S108 in FIG. 3).

The controller 101 then controls the image data storage unit 130 and the image processor 140 in such a manner as to read a pattern from the storage unit 104 for an image of the next chart and generate a chart used in measurement mode, and generates chart image data to form images of charts of the number of sheets required in measurement mode (NO in step S109 and S110 in FIG. 3). The controller 101 then performs control in such a manner as to again repeat the formation of an image of the generated next chart image data on transfer paper (step S103 in FIG. 3) and the conveyance of the chart formed on the transfer paper to the reading apparatus 200 (step S104 in FIG. 3). In response to this, the controller 201 controls the units of the reading apparatus 200 in such a manner as to repeat a read of a chart and a determination based on a difference between the ideal value and the actual value of the detected rotation steps.

If having completed the formation of images of charts of the number of sheets required in measurement mode and adjustments based on read image data (YES in step S109 in FIG. 3), then the controller 101 transmits a completion notice to the controller 201 via the communication units 102 and 202 (step S111 in FIG. 3), and ends the processing in measurement mode (END in FIG. 3). Similarly the controller 201, which has received the completion notice, also ends the processing in measurement mode (YES in step S211 and END in FIG. 3).

Figure 4:
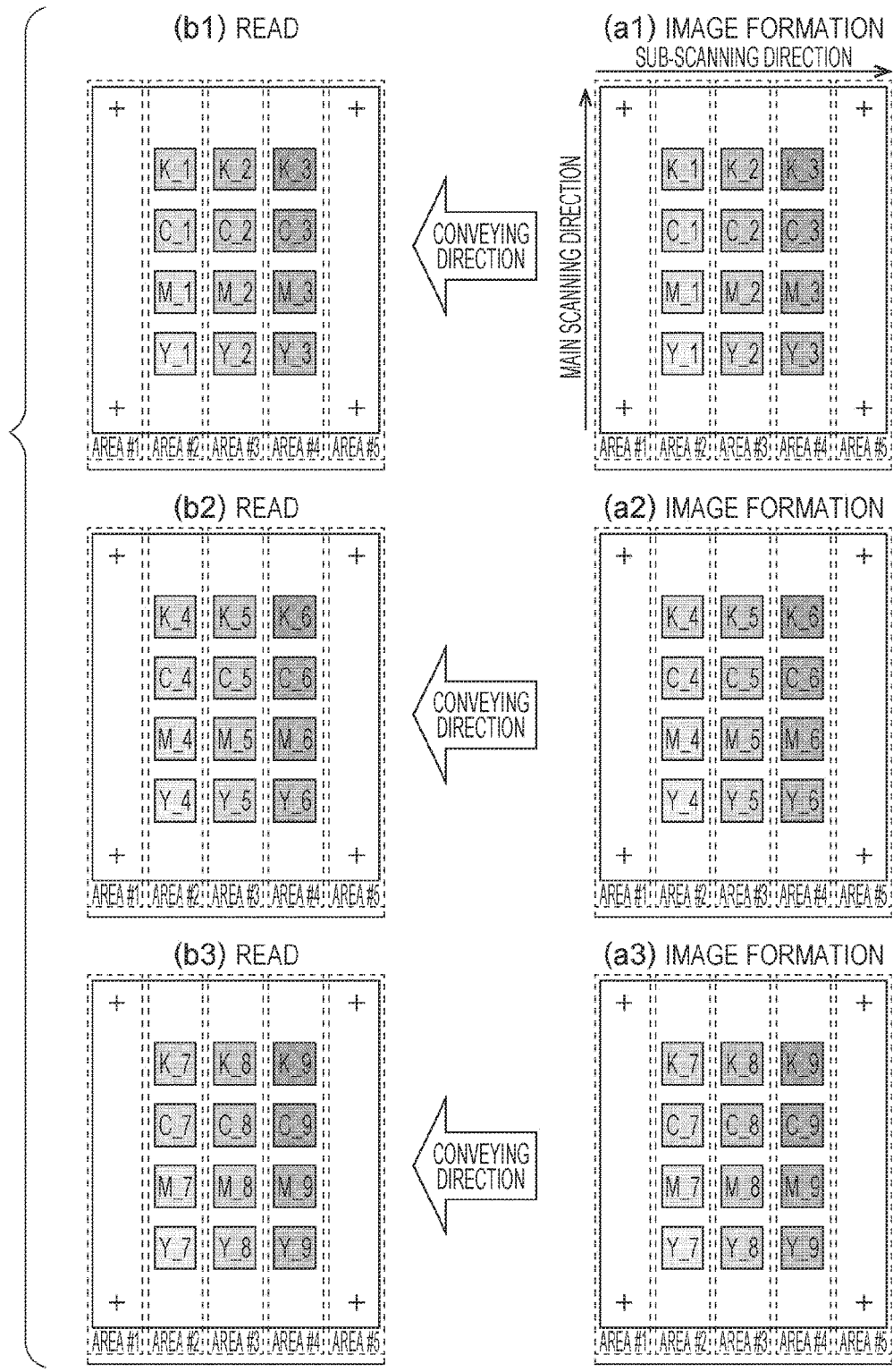
FIG. 4 is an explanatory diagram illustrating a state of reading in the embodiment of the present invention.

FIG. 4 illustrates a state where read image data of a chart whose image was formed has been determined to be valid without influence of speed fluctuations on a read.

Figure 5:
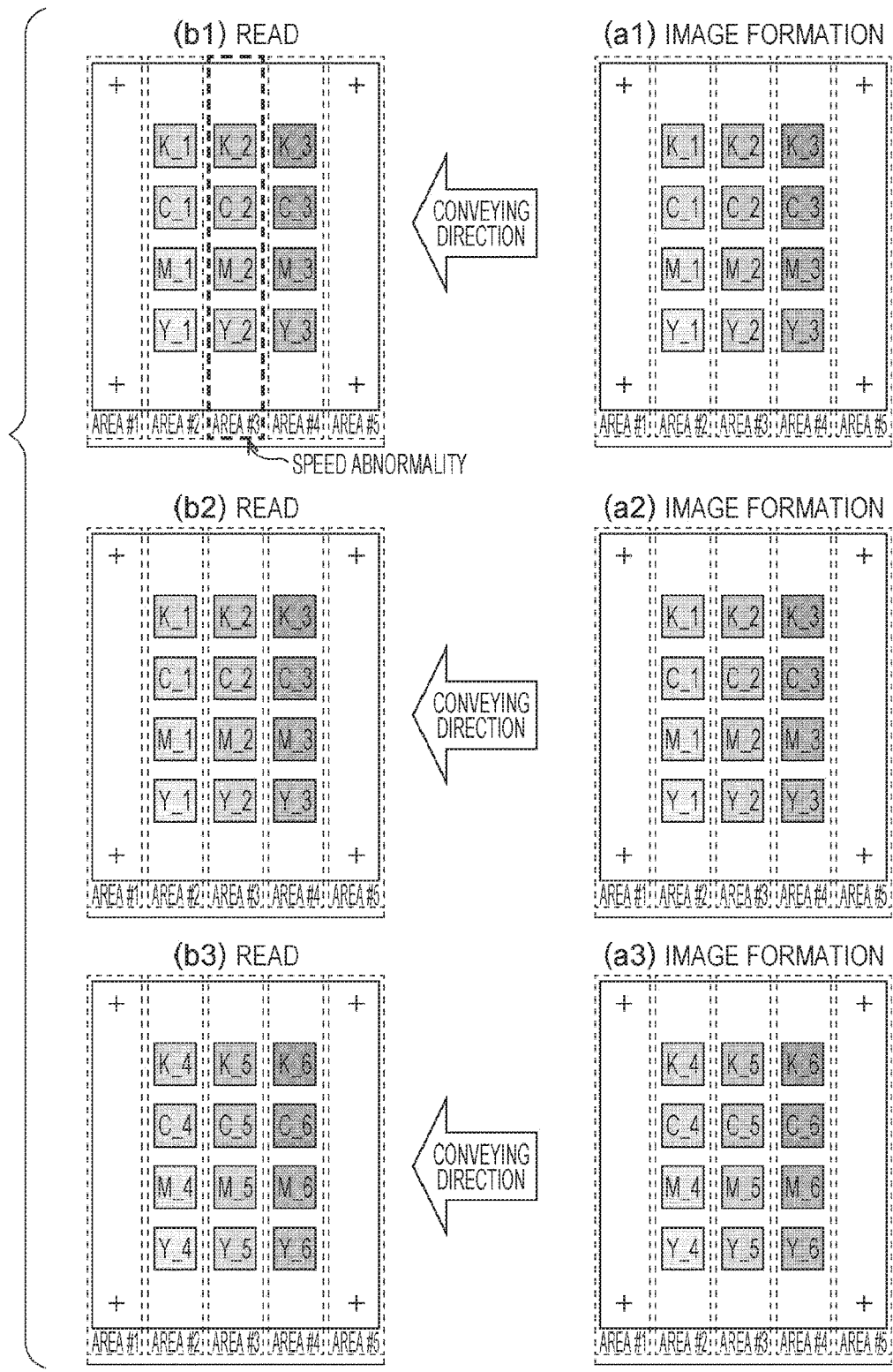
FIG. 5 is an explanatory diagram illustrating a state of reading in the embodiment of the present invention.

On the other hand, FIG. 5 illustrates by example a case where the controller 201 has determined that a read (FIG. 5 (b1)) of a chart whose image was formed (FIG. 5 (a1)) is invalid due to a speed abnormality in area #3. In this case, the controller 101 controls the image former 150 in such a manner as to again form the image of the chart which was formed (FIG. 5 (a1)) (steps S208 and S107 in FIG. 3). Consequently, even if the speed fluctuates during highly accurate conveyance for reading transfer paper, an image of the same chart is formed again and read. Accordingly, valid read image data can be obtained to enable appropriate image corrections.

It may be configured in such a manner that an image of not the entire chart but only an area that has been determined to be invalid is formed and read when the image of the same chart is formed again in FIG. 5 (a2).

This area may be determined on the basis of a separation position of a patch in a sub-scanning direction by obtaining information on the patch from the image forming apparatus 100, or an area may be predetermined regardless of the position of the patch.

[Operation (2)]

An embodiment of the reading apparatus, the reading control method, and the reading control program as operation (2) of the embodiment is described below with reference to a flowchart of FIG. 6. An overlapping description of the same processes as the already described operation (1) is omitted here.

The controller 101, which has received a determination result of validity/invalidity of a read image from the controller 201 as described above (step S105 in FIG. 6), if the read image was determined to be invalid (NO in step S106a in FIG. 6), determines whether or not the invalidity determination influences adjustments (step S106b in FIG. 6). The invalidity determination of the controller 201 may be relaxed in, for example, an adjustment to be made (NO in step S106b in FIG. 6). The controller 101 similarly handles this case to a case where a read image is determined to be valid (NO in step S106b in FIG. 6) to make various image adjustments to, for example, density and the image forming position, in the image former 150 by using the read image data of the chart (step S108 in FIG. 6).

On the other hand, after the controller 201 determined that the read image is invalid (NO in step S106a in FIG. 3), if the controller 101 has determined that the invalidity determination influences the adjustments (YES in step S106b in FIG. 6), the controller 101 controls the image data storage unit 130 and the image processor 140 in such a manner as to read a pattern from the storage unit 104 for an image of the same chart as the one whose read image data has been determined to be invalid, and generate a chart used in measurement mode, and generates chart image data (step S107 in FIG. 3). The controller 101 then performs control in such a manner as to again repeat the formation of an image of the generated chart image data on transfer paper (step S103 in FIG. 3), and the conveyance of the chart formed on the transfer paper to the reading apparatus 200 (step S104 in FIG. 3).

Figure 6:
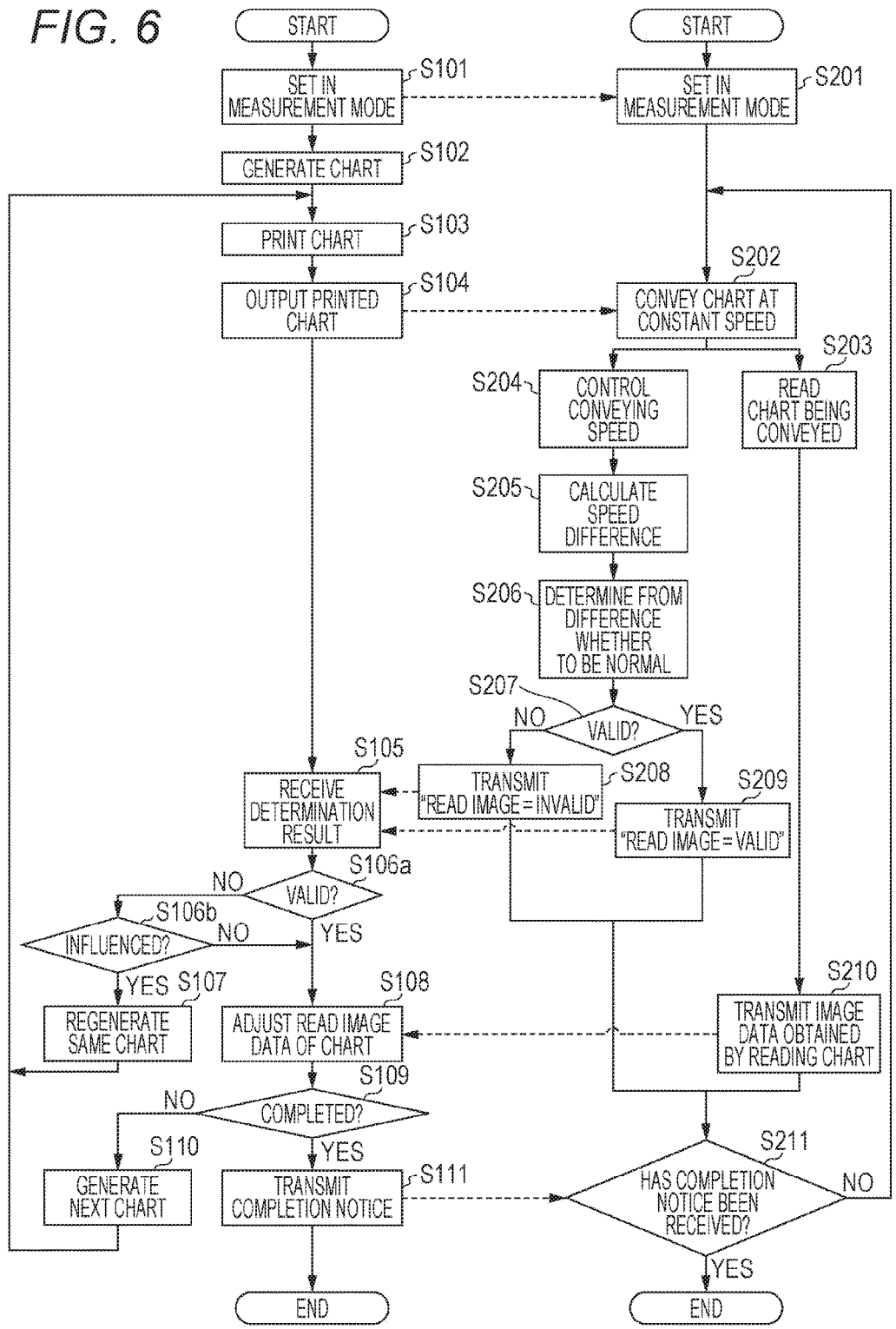
FIG. 6 is a flowchart illustrating operation of the embodiment of the present invention.

In the above case, also if an area that has been determined by the controller 201 that a read is invalid is an area where a patch of the chart is not present, there is no adverse effect on the read image data (NO in step S106b in FIG. 6). The controller 101 similarly handles this case to the case where a read image is determined to be valid (NO in step S106b in FIG. 6), and makes various image adjustments to, for example, density and the image forming position, in the image former 150 by using the read image data of the chart (step S108 in FIG. 6).

[Operation (3)]

Figure 7:
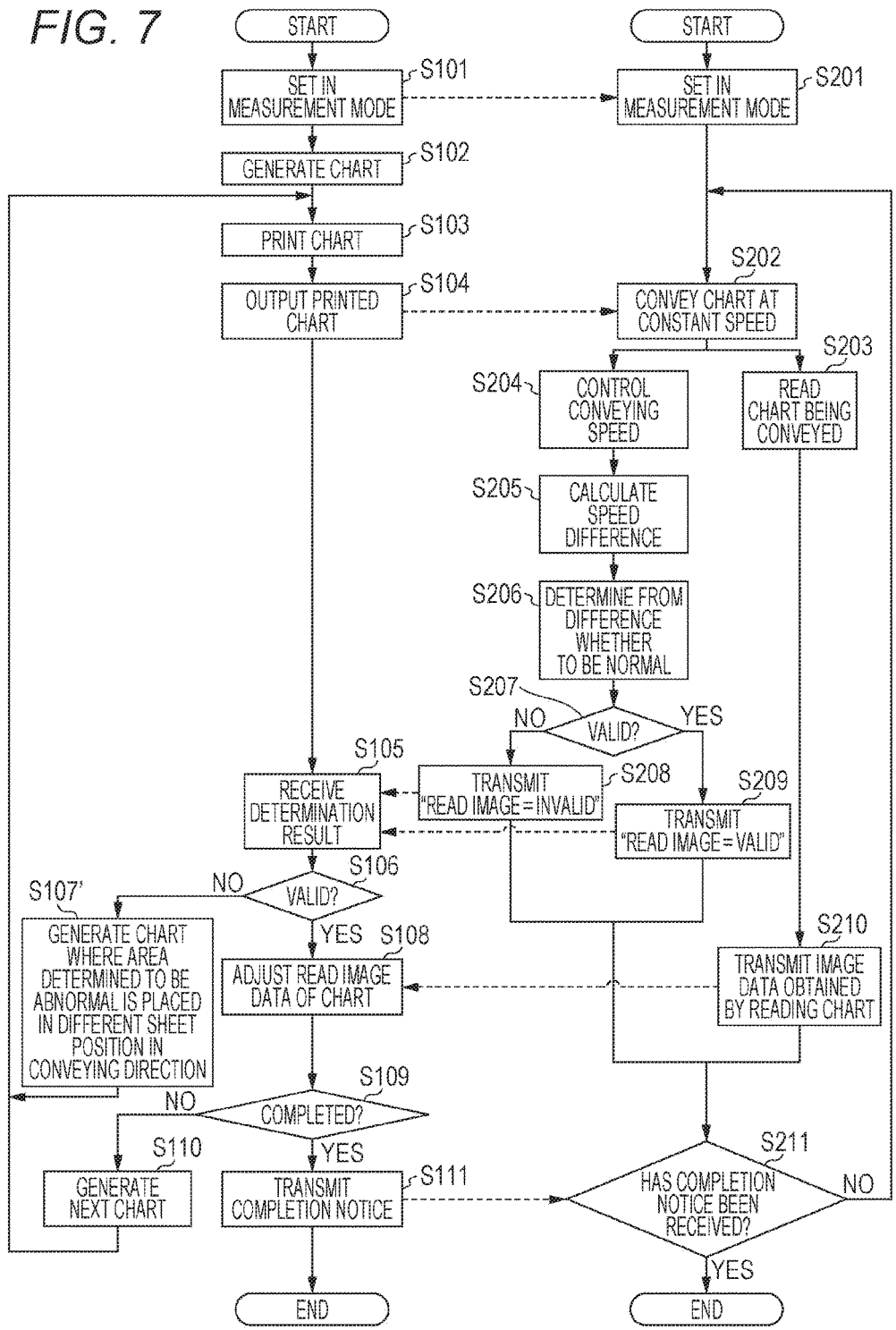
FIG. 7 is a flowchart illustrating operation of the embodiment of the present invention.

An embodiment of the reading apparatus, the reading control method, and the reading control program as operation (3) of the embodiment is described below with reference to a flowchart of FIG. 7. An overlapping description of the same processes as the already described operation (1) and (2) is omitted here.

The controller 101, which has received a determination result of validity/invalidity of a read image from the controller 201 as described above (step S105 in FIG. 7), if the read image has been determined to be invalid (NO in step S106 in FIG. 7), controls the image former 150 in such a manner as to read a pattern from the storage unit 104 for an image of the same chart as the one whose read image data has been determined to be invalid and again form an image of an area determined to be invalid in an area different from the original area on transfer paper (step S107' in FIG. 7).

The different area in this case indicates an area that is different at least in the sub-scanning direction to handle speed fluctuations resulting from vibrations related to the conveyance. Moreover, in order to again form the image of the area determined to be invalid in the area different from the original area on the transfer paper, an image of an area determined to be valid is not formed to create a blank area.

In other words, if an image is present in an area determined to be invalid, the image present is formed again in a different area on transfer paper. Accordingly, the possibility to be able to avoid repeatable speed fluctuations is increased. When the speed fluctuates during highly accurate conveyance for reading transfer paper, it becomes possible to make appropriate image corrections.

Figure 8:
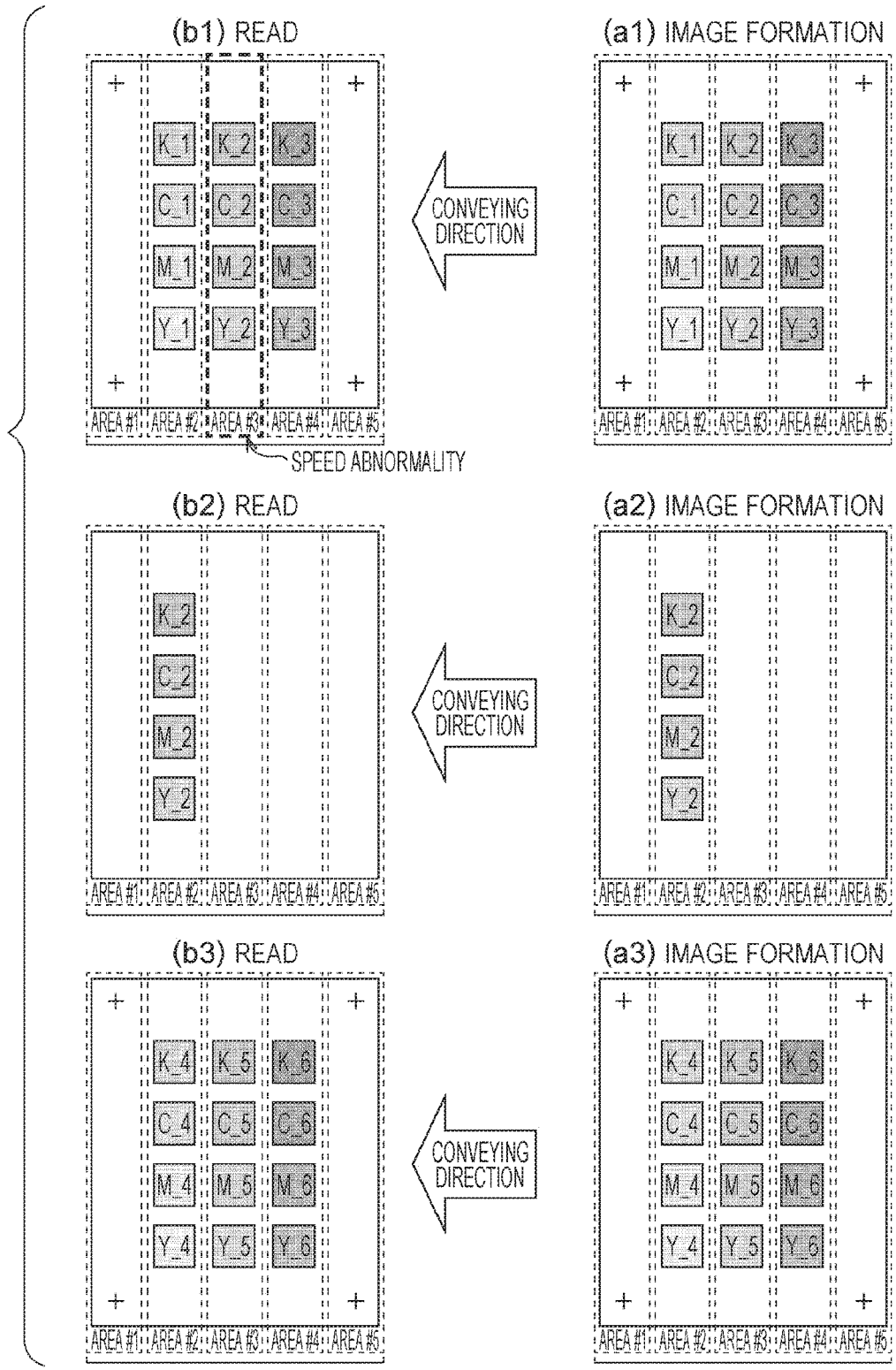
FIG. 8 is an explanatory diagram illustrating a state of reading in the embodiment of the present invention.

Assume that a speed fluctuation has been detected in area #3 in the reading apparatus 200 (refer to FIG. 8 (b1)). In this case, the controller 101 is configured to form an image of an area determined to be invalid in an area other than area #3, for example, area #2 (FIG. 8 (*a*2)), and read the chart in the reading apparatus 200 (FIG. 8 (*b*2)). Consequently, the possibility to be able to avoid speed fluctuations resulting from, for example, entry into between rollers upon conveyance is increased. If the speed fluctuates during highly accurate conveyance for reading transfer paper, it becomes possible to make appropriate image corrections.

Moreover, in order to prevent a read of the chart whose image has been formed again from being determined again to be invalid, it is also possible to form the image originally formed in area #3 in a plurality of areas #2 and #4.

[Operation (4)]

Figure 9:
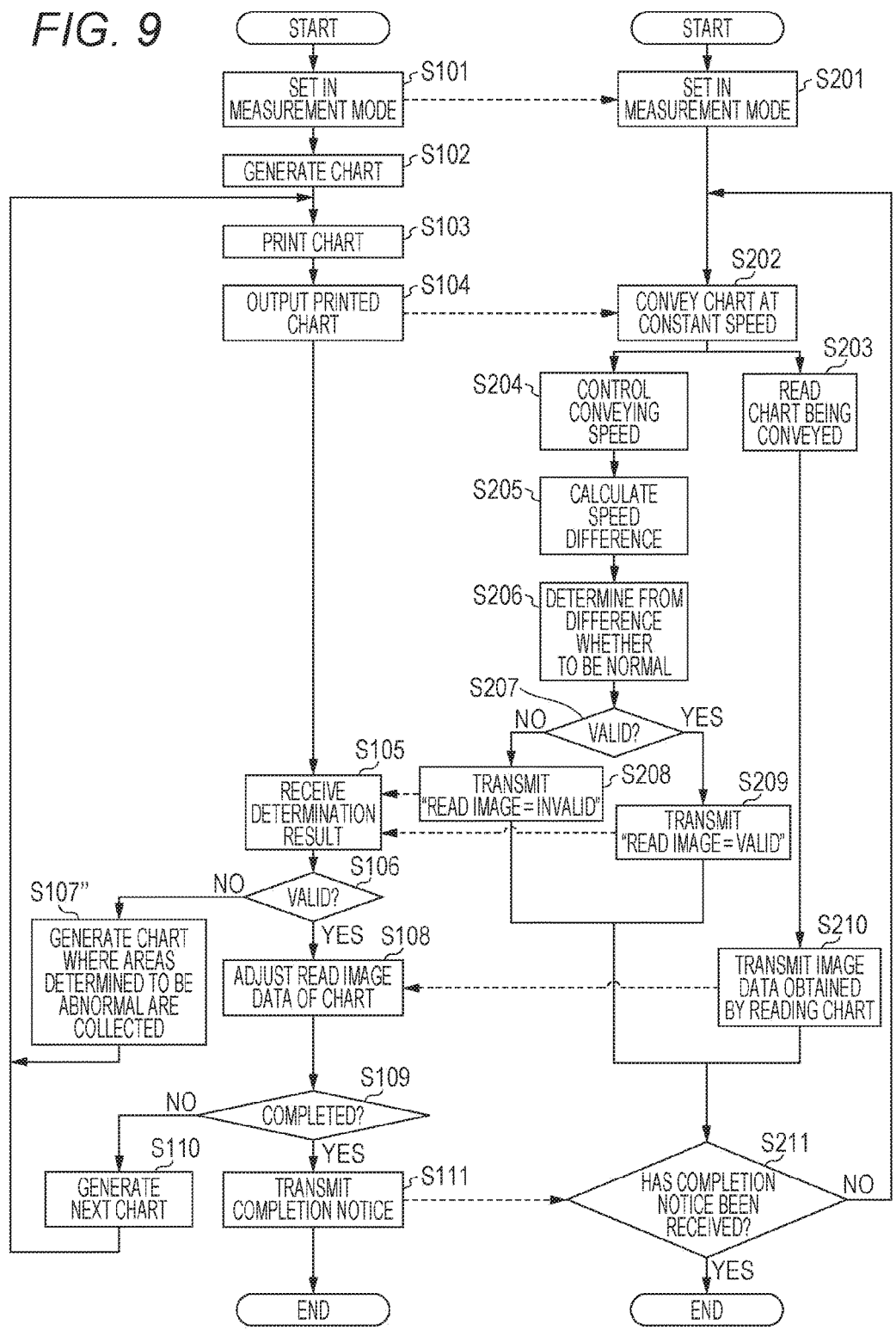
FIG. 9 is a flowchart illustrating operation of the embodiment of the present invention.

An embodiment of the reading apparatus, the reading control method, and the reading control program as operation (4) of the embodiment is described below with reference to a flowchart of FIG. 9. An overlapping description of the same processes as the already described operation (1), (2), and (3) is omitted here.

When a notice of an area where a read of an image was determined to be invalid has been received as described above (step S105 in FIG. 9), there is a plurality of sheets of transfer paper each including an area where a read was determined to be invalid, a chart where images of a plurality of the areas, where a read was determined to be invalid, on the plurality of sheets of transfer paper are collected is generated (step S107" in FIG. 9).

Figure 10:
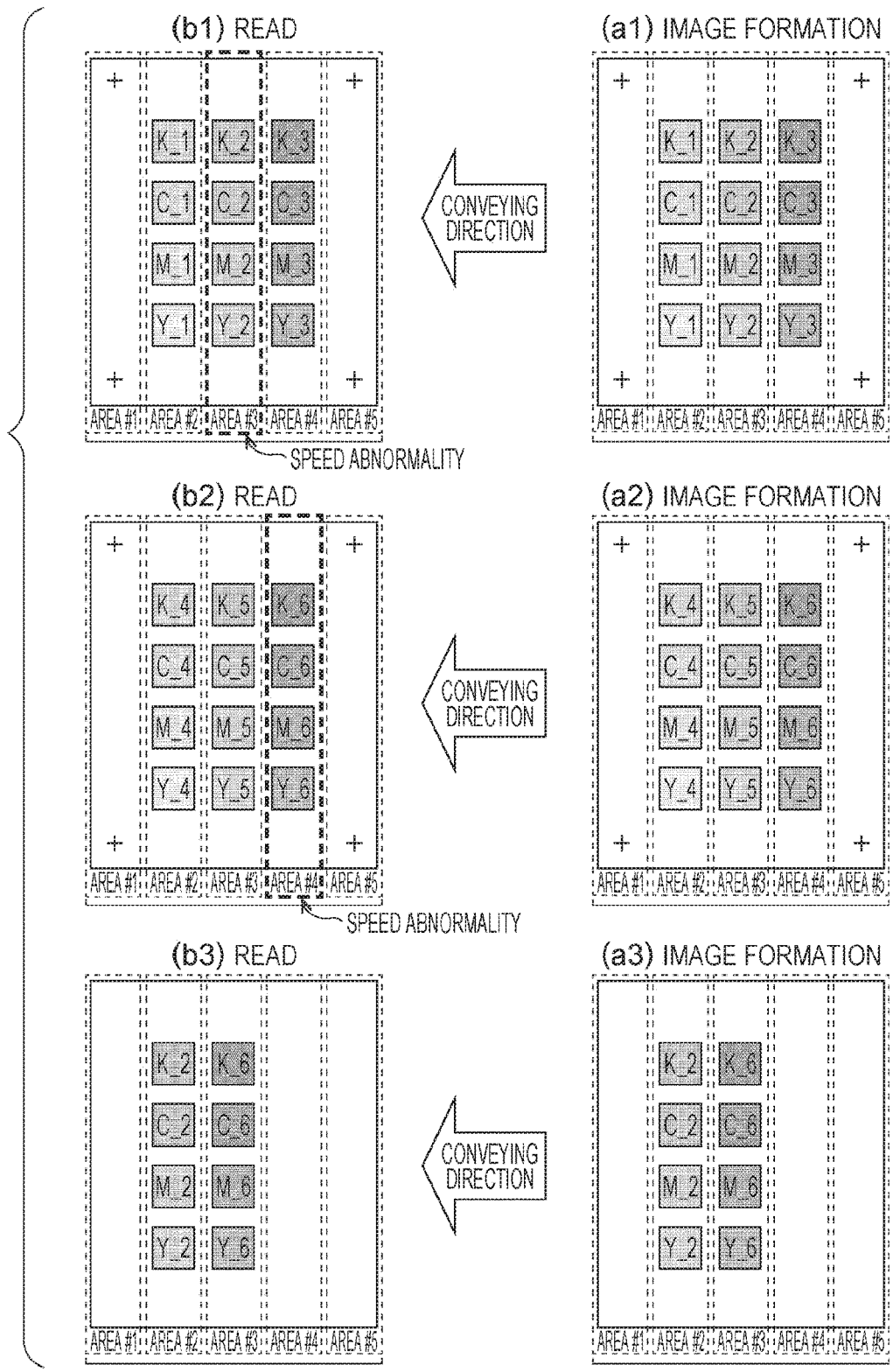
FIG. 10 is an explanatory diagram illustrating a state of reading in the embodiment of the present invention.

Assume, in FIG. 10, that a speed fluctuation was detected in area #3 on a first sheet (refer to FIG. 10 (*b*1)), and then in area #4 on a second sheet (refer to FIG. 10 (*b*2)) in the reading apparatus 200. A plurality of areas of the charts determined to be invalid is collected in one chart (FIG. 10 (*a*3)) in this manner to form an image on transfer paper. Accordingly, it becomes possible to form and read an image of the chart without waste, and to make appropriate image corrections if the speed fluctuates during highly accurate conveyance for reading transfer paper. In this case, it also becomes possible to avoid waste of transfer paper and reduce the measurement time.

[Operation (5)]

In the above operation, the controller 201 is desired to control the pulse width of the target rotation steps of the driver 211 in real time, or after acquiring a difference pattern, to offset the above difference.

Assume, for example, that differences are accumulated as in FIG. 11A. In this case, the controller 201 acquires a pattern of the accumulation of the differences. As in FIG. 11B, the driver 211 then controls the pulse width of steps supplied to the stepping motor 212 to bring the cumulative difference to zero. It is simply required to perform control with, for example, the number of clock pulses that determines the pulse width. In FIG. 11B, the number of clock pulses that determines the pulse width of the target rotation steps in the driver 211 is changed to 2999 or 3001 as compared with a target of 3000.

Figure 12A:
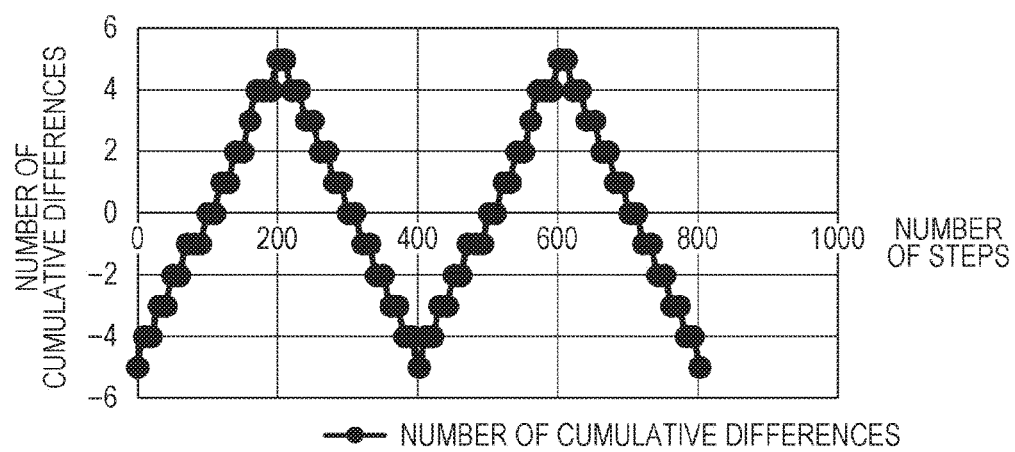
FIGS. 12A and 12B are explanatory diagrams illustrating a state of motor control in the embodiment of the present invention.
Figure 12B:
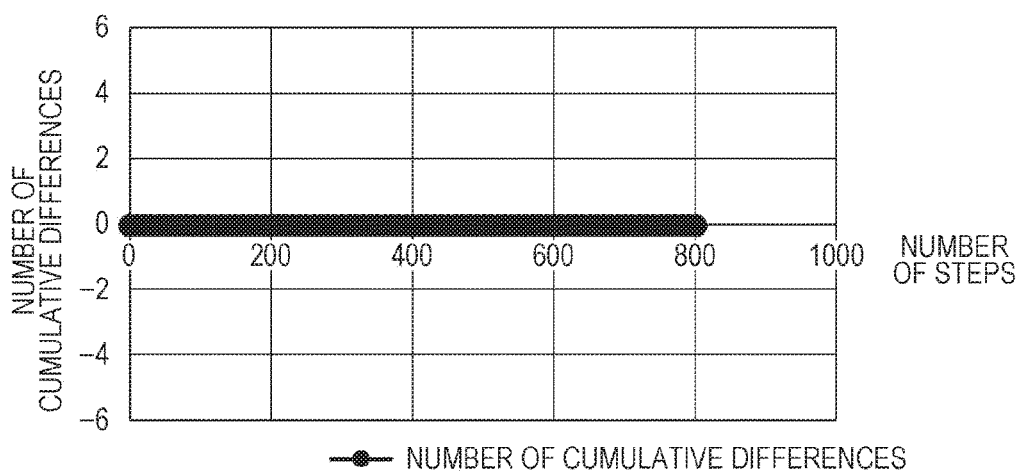

As a result, such cumulative differences before correction as illustrated in FIG. 12A are controlled in such a manner as to be brought to zero by offsetting the differences as in FIG. 12B. Hence, the conveying speed of transfer paper can be kept constant with higher accuracy. If the speed fluctuates during highly accurate conveyance for reading transfer paper, it becomes possible to make appropriate image corrections.

Moreover, the example where a difference pattern is acquired was illustrated here. However, if the encoder 213 detects a difference in real time, the driver 211 may control the pulse width of the next step supplied to the stepping motor 212.

(1) According to an embodiment of the invention, in a reading apparatus reflecting one aspect of the present invention, transfer paper on which an image has been formed is conveyed by using rotation of a stepping motor controlled in such a manner as to be rotated in predetermined target rotation steps, a reader reads the image formed on the transfer paper in a state where the transfer paper is being conveyed by a conveyor, an encoder detects detected rotation steps of the stepping motor, and a controller determines whether a read in the reader is valid or invalid on the basis of a difference between an ideal value and an actual value of the detected rotation steps. Consequently, if the difference between the detected rotation steps and the target rotation steps is equal to or greater than a constant value, the read is determined to be invalid. If the difference between the detected rotation steps and the target rotation steps is less than the constant value, the read is determined to be valid. Accordingly, it becomes possible to make appropriate image corrections if the speed fluctuates during highly accurate conveyance for reading transfer paper.

(2) In the above reading apparatus of (1), the controller determines that the read in the reader is invalid if the difference exceeds a predetermined threshold on the basis of a comparison of the difference and the threshold. Consequently, validity or invalidity of a read is correctly determined. Accordingly, it becomes possible to make appropriate image corrections if the speed fluctuates during highly accurate conveyance for reading transfer paper.

(3) In the above reading apparatus of (1) and (2), the transfer paper is divided into a plurality of areas to determine whether the read in the reader is valid or invalid. Consequently, an invalid area is not used for correction, and a valid area is used for correction. Accordingly, it becomes possible to make appropriate image corrections if the speed fluctuates during highly accurate conveyance for reading transfer paper.

(4) In the above reading apparatus of (1) to (3), the encoder is placed in such a manner as to perform detection on a rotary shaft of the stepping motor. Consequently, the detected rotation steps can be detected directly from the stepping motor without being influenced by speed fluctuations caused by a speed variation mechanism, the accommodation of the fluctuations, and the like. Accordingly, it becomes possible to make appropriate image corrections if the speed fluctuates during highly accurate conveyance for reading transfer paper.

(5) In the above reading apparatus of (1) to (4), the controller controls the target rotation steps of a driver in such a manner as to offset the difference. Consequently, the conveying speed of transfer paper can be kept constant with high accuracy. Accordingly, it becomes possible to make appropriate image corrections if the speed fluctuates during highly accurate conveyance for reading transfer paper.

(6) In an image forming system reflecting one aspect of the present invention, transfer paper on which an image has been formed is conveyed by using rotation of a stepping motor controlled in such a manner as to be rotated in predetermined target rotation steps, a reader reads the image formed on the transfer paper in a state where the transfer paper is being conveyed by a conveyor, an encoder detects detected rotation steps of the stepping motor, and a controller determines whether a read in the reader is valid or invalid on the basis of a difference between an ideal value and an actual value of the detected rotation steps in the target rotation steps. Consequently, if the difference between the detected rotation steps and the target rotation steps is equal to or greater than a constant value, the read is determined to be invalid. If the difference between the detected rotation steps and the target rotation steps is less than the constant value, the read is determined to be valid. Accordingly, it becomes possible to make appropriate image corrections if the speed fluctuates during highly accurate conveyance for reading transfer paper.

(7) In the above image forming system of (6), an image forming apparatus, which has received a notice that the read of the image in the reading apparatus is invalid, forms the image where the read has been determined to be invalid, again on transfer paper. Accordingly, it becomes possible to make appropriate image corrections if the speed fluctuates during highly accurate conveyance for reading transfer paper.

(8) In the above image forming system of (6), an image forming apparatus, which has received a notice that the read of the image in the reading apparatus is invalid, when an image is present in an area corresponding to the notice, forms the image present again in a different area on transfer paper. Accordingly, the possibility to be able to avoid repeatable speed fluctuations is increased, and it becomes possible to make appropriate image corrections if the speed fluctuates during highly accurate conveyance for reading transfer paper.

(9) In the above image forming system of (6) to (8), the image forming apparatus, which has received a notice that the read of the image in the reading apparatus is invalid, does not form an image of an area where the read has been determined to be valid, and forms an image of an area where the read has been determined to be invalid, again on transfer paper. Accordingly, it becomes possible to perform a read in a state without waste, and to make appropriate image corrections if the speed fluctuates during highly accurate conveyance for reading transfer paper.

(10) In the above image forming system of (6) to (9), the image forming apparatus, which has received a notice of an area where a read of an image in the reading apparatus is invalid, when a plurality of areas where a read was determined to be invalid is present, forms an image on transfer paper in a state where images of the plurality of areas where the read was determined to be invalid has been collected. Accordingly, it becomes possible to perform a read in a state without waste and to make appropriate image corrections if the speed fluctuates during highly accurate conveyance for reading transfer paper.

(11) In an image forming apparatus reflecting one aspect of the present invention, transfer paper on which an image has been formed is conveyed by using rotation of a stepping motor controlled in such a manner as to be rotated in predetermined target rotation steps, a reader reads the image formed on the transfer paper in a state where the transfer paper is being conveyed by a conveyor, an encoder detects detected rotation steps of the stepping motor, and a controller determines whether a read in the reader is valid or invalid on the basis of a difference between an ideal value and an actual value of the detected rotation steps in the target rotation steps. Consequently, if the difference between the detected rotation steps and the target rotation steps is equal to or greater than a constant value, the read is determined to be invalid. If the difference between the detected rotation steps and the target rotation steps is less than the constant value, the read is determined to be valid. Accordingly, it becomes possible to make appropriate image corrections if the speed fluctuates during highly accurate conveyance for reading transfer paper.

(12) In the above image forming apparatus of (11), if a notice that the read of the image in the reading apparatus is invalid has been received, when an image is present in an area corresponding to the notice, the image present is formed again in a different area on transfer paper. Accordingly, the possibility to be able to avoid repeatable speed fluctuations is increased, and it becomes possible to make appropriate image corrections if the speed fluctuates during highly accurate conveyance for reading transfer paper.

(13) In the above image forming apparatus of (11) and (12), if a notice that the read of the image in the reading apparatus is invalid has been received, an image of an area where the read has been determined to be valid is not formed, and an image of an area where the read has been determined to be invalid is formed again on transfer paper. Accordingly, it becomes possible to perform a read in a state without waste and to make appropriate image corrections if the speed fluctuates during highly accurate conveyance for reading transfer paper.

(14) In the above image forming apparatus of (11) to (13), if a notice of an area where a read of an image in the reading apparatus is invalid has been received, and a plurality of areas where a read was determined to be invalid is present, an image is formed on transfer paper in a state where images of the plurality of areas where the read was determined to be invalid has been collected. Accordingly, it becomes possible to form and read an image of a chart in a state without waste and to make appropriate image corrections if the speed fluctuates during highly accurate conveyance for reading transfer paper.

Although embodiments of the present invention have been described and illustrated in detail, it is clearly understood that the same is by way of illustration and example only and not limitation, the scope of the present invention should be interpreted by terms of the appended claims.

What is claimed is:

1. A reading apparatus comprising:
   a conveyor that conveys transfer paper on which an image has been formed by using rotation of a stepping motor;
   a driver that performs control in such a manner as to supply control pulses to the stepping motor and rotate the stepping motor in predetermined target rotation steps;
   an encoder that detects the rotation of the stepping motor and obtains detected rotation steps;
   a reader that reads the image formed on the transfer paper in a state where the transfer paper is being conveyed by the conveyor; and
   a controller that detects a difference between an ideal value and an actual value of the detected rotation steps in the target rotation steps, and determines, on the basis of the difference, whether a read in the reader is valid or invalid, and wherein the reader reads the density or color of the image formed on the transfer paper and the controller divides the transfer paper into a plurality of areas to determine, on the basis of the difference, whether the read in the reader is valid or invalid.

2. The reading apparatus according to claim 1, wherein the controller determines that the read in the reader is invalid upon the difference exceeding a predetermined threshold on the basis of a comparison of the difference and the threshold.

3. The reading apparatus according to claim 1, wherein the encoder is placed in such a manner as to perform detection on a rotary shaft of the stepping motor.

4. The reading apparatus according to claim 1, wherein the controller controls the target rotation steps of the driver in such a manner as to offset the difference.

5. An image forming system comprising:
   an image forming apparatus that forms an image on transfer paper; and
   a reading apparatus that reads the image formed by the image forming apparatus on the transfer paper, the reading apparatus comprising:
   a conveyor that conveys transfer paper on which an image has been formed by using rotation of a stepping motor;
   a driver that performs control in such a manner as to supply control pulses to the stepping motor and rotate the stepping motor in predetermined target rotation steps;
   an encoder that detects the rotation of the stepping motor and obtains detected rotation steps;
   a reader that reads the image formed on the transfer paper in a state where the transfer paper is being conveyed by the conveyor; and
   a controller that detects a difference between an ideal value and an actual value of the detected rotation steps in the target rotation steps, and determines, on the basis of the difference, whether a read in the reader is valid or invalid,
   wherein the reading apparatus notifies the image forming apparatus of a result of a determination on whether the read is valid or invalid.

6. The image forming system according to claim 5, wherein upon having received a notice that the read of the image in the reading apparatus is invalid, the image forming apparatus forms the image where the read has been determined to be invalid, again on transfer paper.

7. The image forming system according to claim 5, wherein upon having received a notice that the read of the image in the reading apparatus is invalid, when an image is present in an area corresponding to the notice, the image forming apparatus forms the image present again in a different area on transfer paper.

8. The image forming system according to claim 5, wherein upon having received a notice that the read of the image in the reading apparatus is invalid, an image of an area where the read has been determined to be valid is not formed, and an image of an area where the read has been determined to be invalid is formed again on transfer paper.

9. The image forming system according to claim 5, wherein upon having received a notice of an area where a read of an image in the reading apparatus is invalid, and a plurality of areas where a read was determined to be invalid being present, the image forming apparatus forms an image on transfer paper in a state where images of the plurality of areas where the read was determined to be invalid have been collected.

10. An image forming apparatus comprising:
    an image former that forms an image on transfer paper;
    a reading apparatus that reads the image formed by the image forming apparatus on the transfer paper; and
    an image forming controller that controls formation and reading of the image,
    the reading apparatus comprising:
    a conveyor that conveys transfer paper on which an image has been formed by using rotation of a stepping motor;
    a driver that performs control in such a manner as to supply control pulses to the stepping motor and rotate the stepping motor in predetermined target rotation steps;
    an encoder that detects the rotation of the stepping motor and obtains detected rotation steps;
    a reader that reads the image formed on the transfer paper in a state where the transfer paper is being conveyed by the conveyor; and
    a reading apparatus controller that detects a difference between an ideal value and an actual value of the detected rotation steps in the target rotation steps, and determines, on the basis of the difference, whether a read in the reader is valid or invalid, and
    wherein upon having received a notice that the read of the image in the reading apparatus is invalid, the image forming controller controls the image former to form the image where the read has been determined to be invalid, again on transfer paper.

11. The image forming apparatus according to claim 10, wherein upon having received a notice that the read of the image in the reading apparatus is invalid, when an image is present in an area corresponding to the notice, the image forming controller controls the image former in such a manner as to form the image present again in a different area on transfer paper.

12. The image forming apparatus according to claim 10, wherein upon having received a notice that the read of the image in the reading apparatus is invalid, the image forming controller controls the image former in such a manner as to not form an image of an area where the read has been determined to be valid, and form an image of an area where the read has been determined to be invalid, again on transfer paper.

13. The image forming apparatus according to claim 10, wherein upon having received a notice of an area where a read of an image in the reading apparatus is invalid, and a plurality of areas where a read was determined to be invalid being present, the image forming controller controls the image former in such a manner as to form an image on transfer paper in a state where images of the plurality of areas where the read was determined to be invalid have been collected.

* * * * *